US009910424B2

(12) United States Patent
Nagato et al.

(10) Patent No.: US 9,910,424 B2
(45) Date of Patent: Mar. 6, 2018

(54) AUTOMATIC MONITORING INTERVAL-SETTING DEVICE, MACHINE TOOL, AND AUTOMATIC MONITORING INTERVAL-SETTING METHOD

(71) Applicant: FUJI MACHINE MFG. CO., LTD., Chiryu-shi (JP)

(72) Inventors: Kazuyoshi Nagato, Toyoake (JP); Shinya Kumazaki, Toyota (JP); Kazuya Furukawa, Chiryu (JP)

(73) Assignee: FUJI MACHINE MFG. CO., LTD., Chiryu-shi (JP)

( * ) Notice: Subject to any disclaimer, the term of this patent is extended or adjusted under 35 U.S.C. 154(b) by 339 days.

(21) Appl. No.: 14/436,615

(22) PCT Filed: Oct. 29, 2012

(86) PCT No.: PCT/JP2012/077911
§ 371 (c)(1),
(2) Date: Apr. 17, 2015

(87) PCT Pub. No.: WO2014/068644
PCT Pub. Date: May 8, 2014

(65) Prior Publication Data
US 2015/0253759 A1    Sep. 10, 2015

(51) Int. Cl.
*G06F 19/00* (2011.01)
*G05B 19/4065* (2006.01)
*B23Q 17/09* (2006.01)

(52) U.S. Cl.
CPC ..... *G05B 19/4065* (2013.01); *B23Q 17/0952* (2013.01); *G05B 2219/36046* (2013.01);
(Continued)

(58) Field of Classification Search
CPC ...... G05B 19/4065; G05B 2219/50206; G05B 2219/36046; G05B 2219/50185; G05B 2219/50203; B23Q 17/0952
(Continued)

(56) References Cited

U.S. PATENT DOCUMENTS 4,633,720 A * 1/1987 Dybel .................. B21D 55/00
100/99
8,158,419 B2 * 4/2012 Lonberg ............. A01K 67/0275
435/328
(Continued)

FOREIGN PATENT DOCUMENTS

JP    07-132440 A    5/1995
JP    08-019939 A    1/1996
(Continued)

OTHER PUBLICATIONS

International Search Report dated Dec. 4, 2012 in PCT/JP2012/077911 filed Oct. 29, 2012.

*Primary Examiner* — Ziaul Karim
(74) *Attorney, Agent, or Firm* — Oblon, McClelland, Maier & Neustadt, L.L.P.

(57) ABSTRACT

An automatic monitoring interval-setting device, a machine tool, and an automatic monitoring interval-setting method by which a monitoring interval monitoring a load applied to a tool is able to be automatically set are provided. An automatic monitoring interval-setting device includes a control device including a memory section which stores a program including G1 to G3 for processing a workpiece by using a tool, and a calculating section which is able to edit the program and executes a monitoring interval setting step of respectively inserting starting monitoring of a load applied to the tool into the front of G1 to G3 and ending the monitoring of the load into the rear of G1 to G3 with respect to the program.

13 Claims, 13 Drawing Sheets

(52) U.S. Cl.
CPC ............ *G05B 2219/50185* (2013.01); *G05B 2219/50203* (2013.01); *G05B 2219/50206* (2013.01)

(58) Field of Classification Search
USPC ........................................................ 700/175
See application file for complete search history.

(56) References Cited

U.S. PATENT DOCUMENTS

| | | | |
|---|---|---|---|
| 8,180,477 B2* | 5/2012 | Mori | G05B 19/406 |
| | | | 345/420 |
| 2009/0185503 A1* | 7/2009 | Tan | H04L 12/66 |
| | | | 370/252 |
| 2012/0254324 A1* | 10/2012 | Majeti | H04L 51/18 |
| | | | 709/206 |
| 2012/0254325 A1* | 10/2012 | Majeti | H04L 51/18 |
| | | | 709/206 |

FOREIGN PATENT DOCUMENTS

| | | | |
|---|---|---|---|
| JP | 2004-102568 A | 4/2004 |
| JP | 2008-036804 A | 2/2008 |
| JP | 2009-285792 A | 12/2009 |
| JP | 2011-118840 A | 6/2011 |

\* cited by examiner

AUTOMATIC MONITORING INTERVAL-SETTING DEVICE, MACHINE TOOL, AND AUTOMATIC MONITORING INTERVAL-SETTING METHOD

TECHNICAL FIELD

The present disclosure relates to an automatic monitoring interval-setting device which is used at the time of setting a monitoring interval for monitoring a load applied to a tool, a machine tool including the automatic monitoring interval-setting device, and an automatic monitoring interval-setting method.

BACKGROUND ART

In a turning machine, when a blade of a tool is chipped during workpiece processing, torque of a motor moving the tool or torque of a main axis motor moving a workpiece varies. A processing load monitoring method disclosed in PTL 1 detects chipping of the blade of the tool on the basis of the torque change. That is, in the processing load monitoring method disclosed in PTL 1, an actual torque change is compared with a threshold value for abnormality determination, and when the actual torque exceeds the threshold value, it is determined that the chipping occurs.

CITATION LIST

Patent Literature

PTL 1: JP-A-7-132440
PTL 2: JP-A-2008-36804

SUMMARY

Technical Problem

For example, when an outer circumferential surface of a cylindrical workpiece is subjected to cutting processing by using the turning machine, first, the workpiece is rotated around a main axis (operation a). Next, the blade of the tool is in contact with the outer circumferential surface of the workpiece (operation b). Subsequently, the tool is moved in an axis direction of the workpiece, and thus the outer circumferential surface of the workpiece is subjected to the cutting processing (operation c). Finally, the blade of the tool is separated from the outer circumferential surface of the workpiece (operation d).

Among these successive operations a to d, at the time of performing the operation b or the operation d, the torque of the motor moving the tool or the torque of the main axis motor moving the workpiece varies considerably. For this reason, the torque easily exceeds the threshold value. Therefore, in practice, even though the blade of the tool is not chipped, it may be erroneously determined that the blade is chipped.

Therefore, in order to avoid such erroneous discrimination, the present inventors have conceived that a monitoring interval is to be set. That is, it is necessary to monitor the torque only in the operation c among the successive operations a to d, that is, only during the cutting processing of the outer circumferential surface of the workpiece. For this reason, the monitoring interval may be set such that only the operation c is included. Thus, when the monitoring interval is set, it is possible to avoid the erroneous determination.

However, it is difficult for an operator to manually set the monitoring interval. That is, it is necessary for the operator to display a program for workpiece processing on a screen of a machine tool, and to insert a starting point of the monitoring interval into the front of a cutting operation (the operation c) in the program and a terminal point of the monitoring interval into the rear thereof. In addition, when the monitoring interval is manually set, overlapping of the monitoring interval easily occurs. In addition, an incomplete monitoring interval is easily set. For example, a monitoring interval may be set in which there is a starting point but there is no terminal point.

From this point, in PTL 2, an NC device is disclosed in which an M code is able to be automatically inserted before and after a G code commanding a rapid traverse operation at the time of reading a program. However, in PTL 2, a technology of monitoring the torque of the motor moving the tool or the torque of the main axis motor moving the workpiece is not disclosed. In addition, a technology of setting the monitoring interval which monitors the torque, that is, the load applied to the tool is not disclosed.

Therefore, an object of the present disclosure is to provide an automatic monitoring interval-setting device which is able to automatically set a monitoring interval monitoring a load applied to a tool, a machine tool including the automatic monitoring interval-setting device, and an automatic monitoring interval-setting method.

Solution to Problem

In order to solve the problem described above, an automatic monitoring interval-setting device of the present disclosure includes a control device including a memory section which stores a program including a processing command processing a workpiece by using a tool, and a calculating section which is able to edit the program and executes a monitoring interval setting step of respectively inserting a monitoring starting command starting monitoring of a load applied to the tool into the front of the processing command and a monitoring ending command ending the monitoring of the load into the rear of the processing command with respect to the program.

According to the automatic monitoring interval-setting device of the present disclosure, it is possible to automatically insert the monitoring starting command into the front of the processing command in the program. In addition, it is possible to automatically insert the monitoring ending command into the rear of the processing command in the program. That is, it is possible to automatically set the monitoring interval (a zone from the monitoring starting command to the monitoring ending command) in the program such that the processing command is interposed from front and rear directions. For this reason, when workpiece processing is performed, it is possible to monitor the load applied to the tool. Therefore, for example, it is possible to detect damage in the tool on the basis of the load.

In addition, according to the automatic monitoring interval-setting device of the present disclosure, a human mistake such as overlapping of the monitoring interval or setting of an incomplete monitoring interval rarely occurs compared to a case where the monitoring interval is manually set. Therefore, even when the number of settings of the monitoring interval increases, it is possible to accurately set the monitoring interval.

Preferably, in another configuration, when the program includes a plurality of successive processing commands, the calculating section may respectively insert the monitoring starting command into the front of the first processing command and the monitoring ending command into the rear of the last processing command with respect to the program, in the monitoring interval setting step.

According to this configuration, it is possible to comprehensively set the monitoring interval with respect to the plurality of processing commands. For this reason, a setting operation of the monitoring interval becomes simple compared to a case where the monitoring interval is individually set with respect to the plurality of processing commands. In addition, it is possible to reduce the number of insertions of the monitoring starting command and the monitoring ending command with respect to the program. Therefore, it is possible to prevent the program from being redundant.

Preferably, in another configuration, a display device which is able to display data relevant to the program may be further included, and the calculating section may respectively insert a display starting command starting display of the load on the display device and a display ending command ending the display of the load such that the monitoring starting command and the monitoring ending command are inserted between the display starting command and the display ending command with respect to the program, in the monitoring interval setting step. According to this configuration, it is possible to display the load of the monitoring interval on the display device. For this reason, the operator is able to confirm the load.

Preferably, in another configuration, the calculating section may execute a program selecting step of selecting the program which inserts the monitoring starting command and the monitoring ending command from a plurality of programs, before the monitoring interval setting step. According to this configuration, it is possible to set the monitoring interval with respect to a desired program among the plurality of programs. That is, it is possible to perform the monitoring of the load with respect to the desired program.

Preferably, in another configuration, the calculating section may execute a tool selecting step of selecting the tool which inserts the monitoring starting command and the monitoring ending command from a plurality of tools, before the monitoring interval setting step. According to this configuration, it is possible to set the monitoring interval with respect to a desired tool among the plurality of tools. That is, it is possible to perform the monitoring of the load with respect to the desired tool.

Preferably, in another configuration, the calculating section may execute an inspecting step of inspecting the monitoring starting command and the monitoring ending command which are inserted into the program, after the monitoring interval setting step. According to this configuration, it is possible to detect a setting mistake of the monitoring interval which is set by the monitoring interval setting step.

Preferably, in another configuration, the calculating section may execute a saving step of storing the program into which the monitoring starting command and the monitoring ending command are inserted in the memory section, after the monitoring interval setting step. According to this configuration, it is possible to store the program after setting the monitoring interval in the memory section.

Preferably, in another configuration, the processing command may be a G code, and the monitoring starting command and the monitoring ending command may be M codes which are different from each other.

Here, the "G code" indicates a code relevant to the movement of the axis (for example, a main axis, a slide axis for a tool, and the like), and to setting of a coordinate system or the like. In addition, the "M code" indicates a code functioning as a switch or a flag at the time of moving the machine tool. According to this configuration, M codes which are different from each other are inserted into both front and rear sides of the G code indicating the processing command, and thus it is possible to simply set the monitoring interval.

In order to solve the problem described above, a machine tool of the present disclosure includes the automatic monitoring interval-setting device according to any of the configurations described above. According to the machine tool of the present disclosure, it is possible to automatically set the monitoring interval in the program. In addition, a human mistake rarely occurs at the time of setting the monitoring interval.

In order to solve the problem described above, an automatic monitoring interval-setting method of the present disclosure includes a monitoring interval setting step of respectively inserting a monitoring starting command starting monitoring of a load applied to a tool into the front of a processing command and a monitoring ending command ending the monitoring of the load into the rear of the processing command with respect to a program including the processing command which processes a workpiece by using the tool. According to the automatic monitoring interval-setting method of the present disclosure, it is possible to automatically set the monitoring interval in the program. In addition, a human mistake rarely occurs at the time of setting the monitoring interval.

Preferably, in another configuration, when the program includes a plurality of successive processing commands, the monitoring starting command may be inserted into the front of the first processing command and the monitoring ending command may be inserted into the rear of the last processing command, respectively, with respect to the program, in the monitoring interval setting step. According to this configuration, it is possible to comprehensively set the monitoring interval with respect to the plurality of processing commands.

Preferably, in another configuration, a display starting command starting display of the load on a display device which is able to display data relevant to the program and a display ending command ending the display of the load may be respectively inserted such that the monitoring starting command and the monitoring ending command are inserted between the display starting command and the display ending command with respect to the program, in the monitoring interval setting step. According to this configuration, it is possible to display the load of the monitoring interval on the display device.

Preferably, in another configuration, a program selecting step of selecting the program which inserts the monitoring starting command and the monitoring ending command from a plurality of programs, before the monitoring interval setting step may be further included. According to this configuration, it is possible to set the monitoring interval with respect to a desired program among the plurality of programs.

Preferably, in another configuration, a tool selecting step of selecting the tool which inserts the monitoring starting command and the monitoring ending command from a plurality of tools, before the monitoring interval setting step may be further included. According to this configuration, it is possible to set the monitoring interval with respect to a desired tool among the plurality of tools.

Preferably, in another configuration, an inspecting step of inspecting the monitoring starting command and the monitoring ending command which are inserted into the program, after the monitoring interval setting step may be further included. According to this configuration, it is possible to detect a setting mistake of the monitoring interval.

Preferably, in another configuration, a saving step of storing the program into which the monitoring starting command and the monitoring ending command are inserted, after the monitoring interval setting step may be further included. According to this configuration, it is possible to store the program after setting the monitoring interval.

Preferably, in another configuration, the processing command may be a G code, and the monitoring starting command and the monitoring ending command may be M codes which are different from each other. According to this configuration, it is possible to simply set the monitoring interval.

Advantageous Effects

According to the present disclosure, it is possible to provide an automatic monitoring interval-setting device which is able to automatically set a monitoring interval monitoring a load applied to a tool, a machine tool including the automatic monitoring interval-setting device, and an automatic monitoring interval-setting method.

REFERENCE SIGNS LIST

1: CNC TURNING MACHINE (MACHINE TOOL)
2: CONTROL DEVICE, 20: MEMORY SECTION, 21: CALCULATING SECTION, 22: INPUT/OUTPUT INTERFACE
3: AUTOMATIC MONITORING INTERVAL-SETTING DEVICE

4: TOOL REST, 40: CUTTER REST, 41: TURRET DEVICE, 42: X AXIS LOWER SLIDE, 43: Z AXIS SLIDE, 44: Z AXIS LOWER SLIDE, 45X: X-axis motor, 45Z: Z-axis motor
6: HEADSTOCK, 60: MAIN BODY, 61: MAIN AXIS, 62: CHUCK, 63C: MAIN AXIS MOTOR
7: BED, 70: INCLINED PORTION
8: DISPLAY DEVICE, 80: SCREEN, 800: M CODE AUTOMATIC SETTING BUTTON, 801: POP-UP BLOCK, 801a: KEYPAD, 801b: DISPLAY SECTION, 801c: INPUT BUTTON, 802: POP-UP BLOCK, 802a: DISPLAY SECTION, 802b: OK BUTTON, 802c: CANCEL BUTTON, 810: PROGRAM DISPLAY SECTION, 811: AUTOMATIC INSERT BUTTON, 812: TOOL SELECT BUTTON, 813: M130 INSERT BUTTON, 814: M131 INSERT BUTTON, 815: M132 INSERT BUTTON, 816: M133 INSERT BUTTON, 817: M CODE DELETE BUTTON, 818: OVERWRITE SAVE CHECK BOX, 819: NUMBER DESIGNATION SAVE CHECK BOX, 820: SAVE BUTTON, 821: CURSOR MOVEMENT BUTTON, 83: POP-UP BLOCK, 830: TOOL CHECK BOX, 831: CHECK ALL BUTTON, 832: DELETE ALL BUTTON, 833: OK BUTTON, 834: CANCEL BUTTON, 840: WARNING MESSAGE, 840a: OK BUTTON
90a: PROGRAM, 90b: PROGRAM,
ΔD: MONITORING REGION, D1: LOWER LIMIT THRESHOLD VALUE, D2: UPPER LIMIT THRESHOLD VALUE, ΔT: MONITORING INTERVAL, T130 TO T131: TIME, T1 TO T10: TOOL, W: WORKPIECE

DESCRIPTION OF EMBODIMENTS

Hereinafter, an embodiment will be described in which a machine tool of the present disclosure is embodied as a CNC turning machine.

First Embodiment

Configuration of CNC Turning Machine

Figure 1:
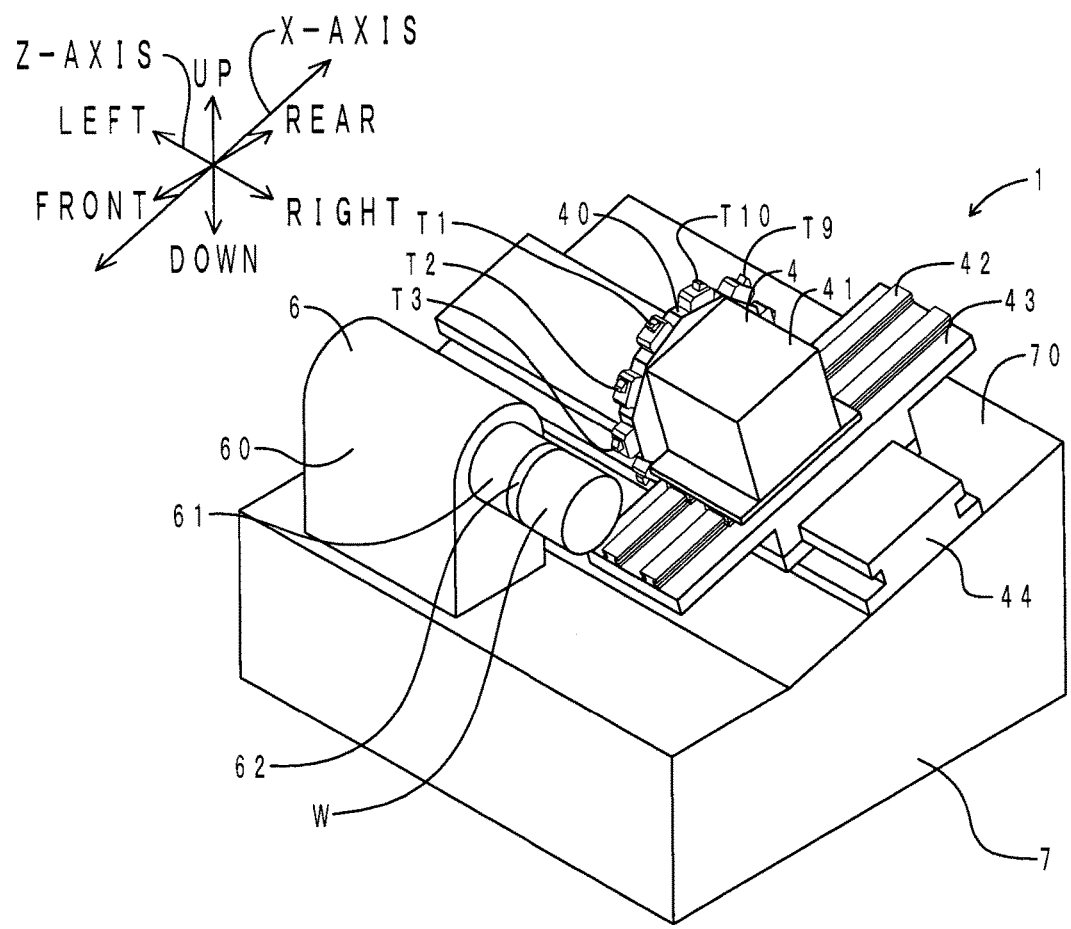
FIG. 1 is an internal perspective view of a CNC turning machine of a first embodiment.
Figure 2:
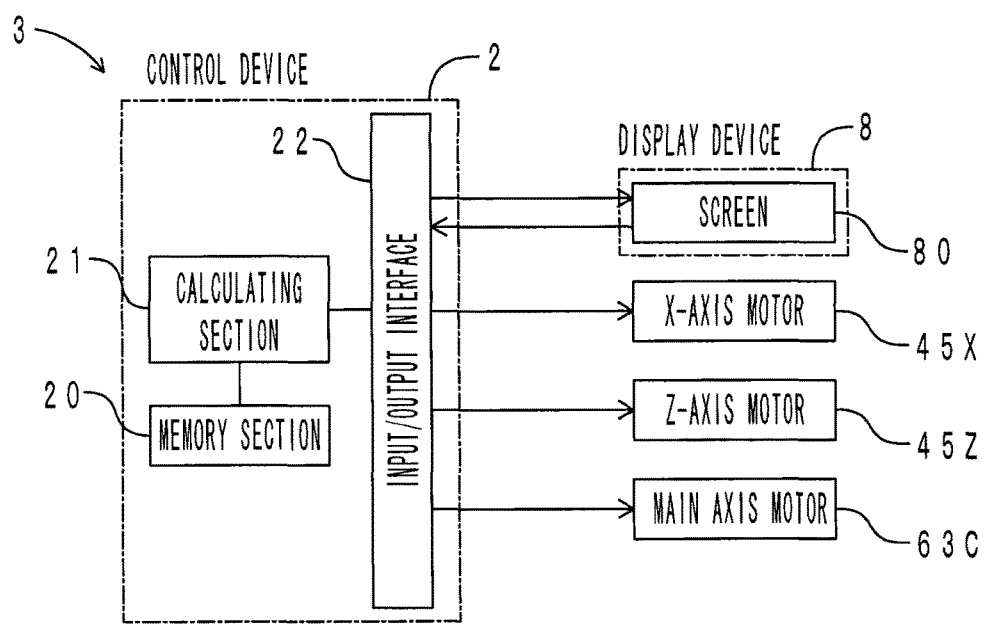
FIG. 2 is a block diagram of the CNC turning machine.

First, the configuration of a CNC turning machine of this embodiment will be described. In FIG. 1, an internal perspective view of the CNC turning machine of this embodiment is illustrated. In FIG. 2, a block diagram of the CNC turning machine is illustrated. As illustrated in FIG. 1 and FIG. 2, a CNC turning machine 1 includes an automatic monitoring interval-setting device 3, a tool rest 4, a headstock 6, and a bed 7. In FIG. 1, a right and left direction corresponds to a Z axis direction (a main axis direction), and a front downward-rear upward direction corresponds to an X axis direction, respectively.

The bed 7 is arranged on a floor surface of an industrial plant. An inclined portion 70 is arranged on an upper rear surface of the bed 7. The headstock 6 includes a main body 60, a main axis 61, and a chuck 62. The main body 60 is arranged on an upper front surface of the bed 7. The main axis 61 protrudes from the main body 60 to the right side. The main axis 61 is able to be rotated around the axis thereof. The chuck 62 is arranged on a right end of the main axis 61. A workpiece W is detachably fixed to the chuck 62.

The tool rest 4 includes a cutter rest 40, a turret device 41, an X axis lower slide 42, a Z axis slide 43, and a Z axis lower slide 44. The Z axis lower slide 44 is arranged in the inclined portion 70 on the upper surface of the bed 7. The Z axis slide 43 is movable with respect to the Z axis lower slide 44 in the right and left direction. The X axis lower slide 42 is arranged on an upper surface of the Z axis slide 43. The turret device 41 is movable with respect to the X axis lower slide 42 in the front downward-rear upward direction. The cutter rest 40 is arranged on a left surface of the turret device 41. Ten holders in total (not illustrated) are arranged in the cutter rest 40 by being separated by 36°. The cutter rest 40 is able to be rotated by the turret device 41 by 36° in a holder unit. Ten tools T1 to T10 are allocated to the ten holders of the cutter rest 40. The tools T1 to T10 are able to perform cutting processing with respect to the workpiece W.

The automatic monitoring interval-setting device 3 includes a control device 2, and a display device 8. The control device 2 includes a memory section 20, a calculating section 21, and an input/output interface 22. The control device 2 is electrically connected to the display device 8, an X-axis motor 45X, a Z-axis motor 45Z, and a main axis motor 63C. The X-axis motor 45X is able to drive the turret device 41 in the front downward-rear upward direction. The Z-axis motor 45Z is able to drive the Z axis slide 43 in the right and left direction. The main axis motor 63C is able to rotatably drive the main axis 61 around the axis.

The display device 8 includes a screen 80. The status of the CNC turning machine 1 or the like is able to be displayed on the screen 80. In addition, a touch button is able to be displayed on the screen 80. The operator inputs instructions into the CNC turning machine 1 through the touch button.

Figure 3:
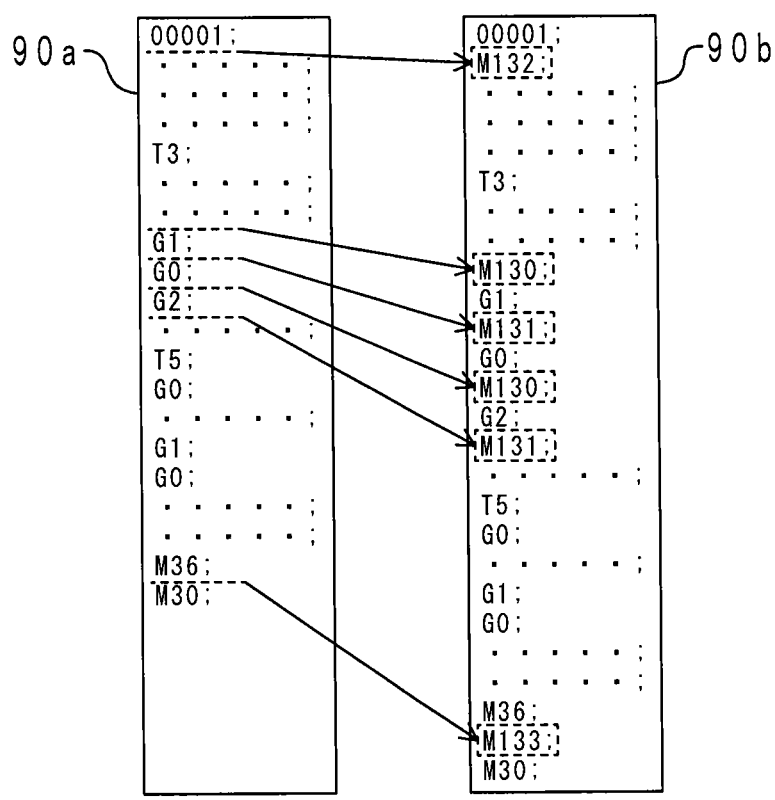
FIG. 3 is a schematic view of a program before and after automatically setting a monitoring interval in an automatic monitoring interval-setting method of the first embodiment.

[Automatic Monitoring Interval-Setting Method] Next, an automatic monitoring interval-setting method executed by the automatic monitoring interval-setting device 3 of this embodiment will be described. In FIG. 3, a schematic view of a program before and after automatically setting the monitoring interval in the automatic monitoring interval-setting method of this embodiment is illustrated. A left side of FIG. 3 is a program 90a before automatically setting the monitoring interval. A right side of FIG. 3 is a program 90b after automatically setting the monitoring interval.

As illustrated in FIG. 3, a G code such as G0, G1, and G2 is used in the programs 90a and 90b. G0 is a G code relevant to positioning of the tools T1 to T10. G0 is used at the time of starting processing at an arbitrary processing portion of the workpiece W and at the time of moving the tools T1 to T10 from another position to the position described above. In addition, G0 is used at the time of ending the processing at the arbitrary processing portion of the workpiece W and at the time of moving the tools T1 to T10 from the position described above to the other position.

G1 is a G code relevant to the movement of the tools T1 to T10 in a linear direction. G1 is used at the time of moving the tools T1 to T10 in the X axis direction and the Z axis direction during the processing of the workpiece W. G2 is a G code relevant to the movement of the tools T1 to T10 in a circular arc direction. G2 is used at the time of moving the tools T1 to T10 in the circular arc direction during the processing of the workpiece W. Furthermore, in addition to these G codes, G3 (a G code relevant to the movement of the tools T1 to T10 in the circular arc direction (a direction opposite to that of G2) or the like may be used. Thus, G1 to G3 in the programs 90a and 90b indicate the processing of the arbitrary processing portion of the workpiece W. Each of G1 to G3 is included in the concept of a "processing command" of the present disclosure.

In the automatic monitoring interval-setting method described later, an M code is automatically inserted into a portion relevant to the tool T3 of the program 90a corresponding to a program number 1, and the program 90b is prepared. M130 is included in the concept of a "monitoring starting command" of the present disclosure. M131 is included in the concept of a "monitoring ending command" of the present disclosure. M132 is included in the concept of a "display starting command" of the present disclosure. M133 is included in the concept of a "display ending command" of the present disclosure.

The automatic monitoring interval-setting method includes a program selecting step, a tool selecting step, a monitoring interval setting step, and an inspecting-saving step. The inspecting-saving step combines an "inspecting step" with a "saving step" of the present disclosure.

Figure 4:
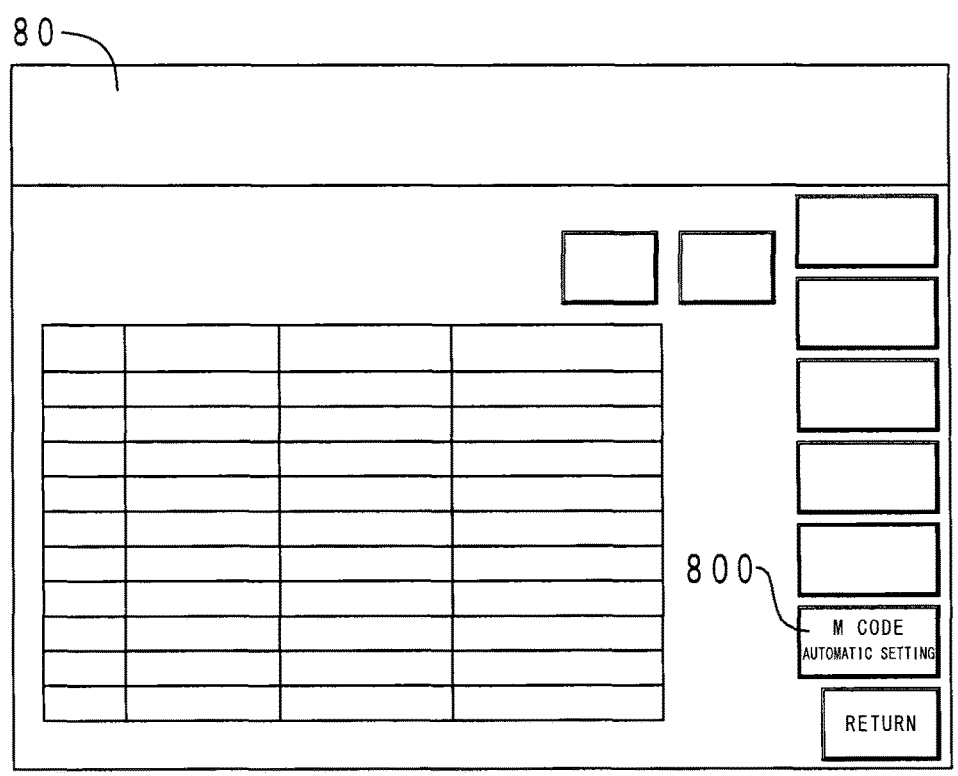
FIG. 4 is a schematic view of a screen in a previous stage of a program selecting step in the automatic monitoring interval-setting method.
Figure 5:
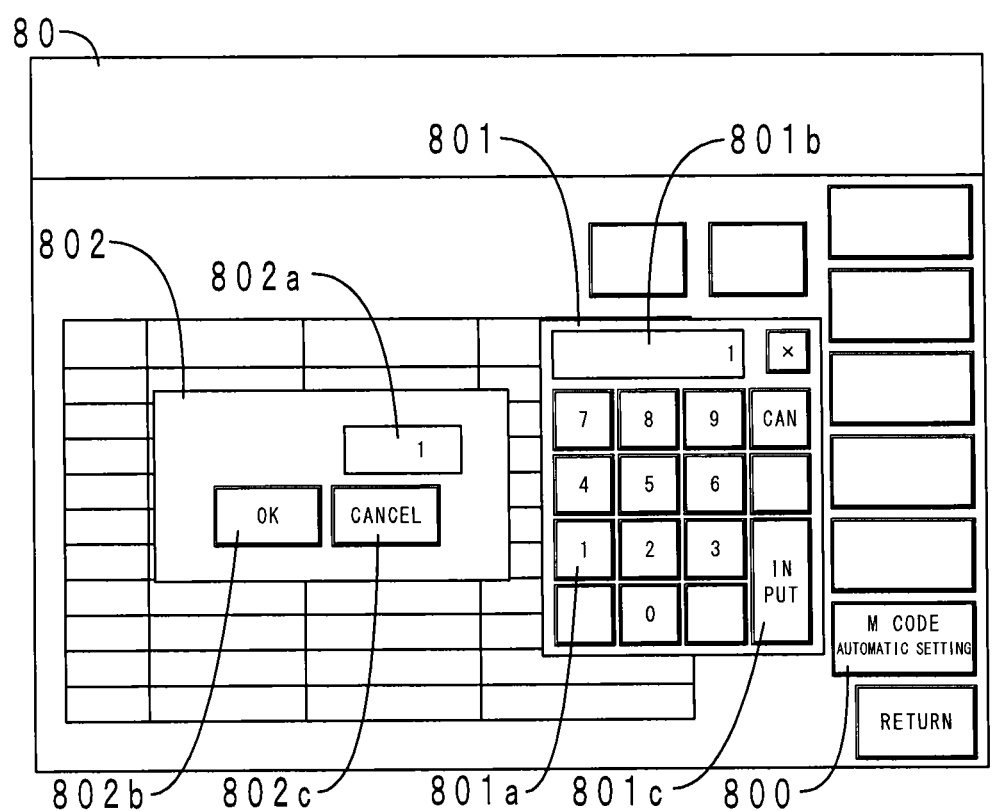
FIG. 5 is a schematic view of a screen in a subsequent stage of the program selecting step.

(Program Selecting Step) In FIG. 4, a schematic view of a screen in a previous stage of the program selecting step in the automatic monitoring interval-setting method of this embodiment is illustrated. In FIG. 5, a schematic view of a screen in a subsequent stage of the program selecting step is illustrated.

In the memory section 20 illustrated in FIG. 2, a plurality of programs for each type of workpiece Ware stored. In this step, the operator selects the program 90a (refer to FIG. 3) to which the monitoring interval is planned to be automatically set from the plurality of programs.

As illustrated in FIG. 4, an M code automatic setting button 800 is displayed on the screen 80. In this step, first, the operator touches the M code automatic setting button 800. As illustrated in FIG. 5, the calculating section 21 illustrated in FIG. 2, displays pop-up blocks 801 and 802 on the screen 80. In the pop-up block 801, a keypad 801a of "0" to "9", a display section 801b, and an input button 801c are arranged. In the pop-up block 802, a display section 802a, an OK button 802b, and a CANCEL button 802c are arranged.

Next, the operator designates the program 90a to which the monitoring interval is planned to be automatically set by using the keypad 801a. The calculating section 21 illustrated in FIG. 2 displays the number "1" of the program 90a which is a desired program of the operator on the display section 801b. Subsequently, the operator touches the input button 801c. The calculating section 21 illustrated in FIG. 2 displays the number "1" of the program 90a on the display section 802a of the pop-up block 802. According to this, the operator confirms whether or not the number "1" of the program 90a in the display section 802a is coincident with the number of the desired program 90a. When both numbers are coincident with each other, the operator touches the OK button 802b. In contrast, when both numbers are not coincident with each other, the operator touches the CANCEL button 802c.

Figure 6:
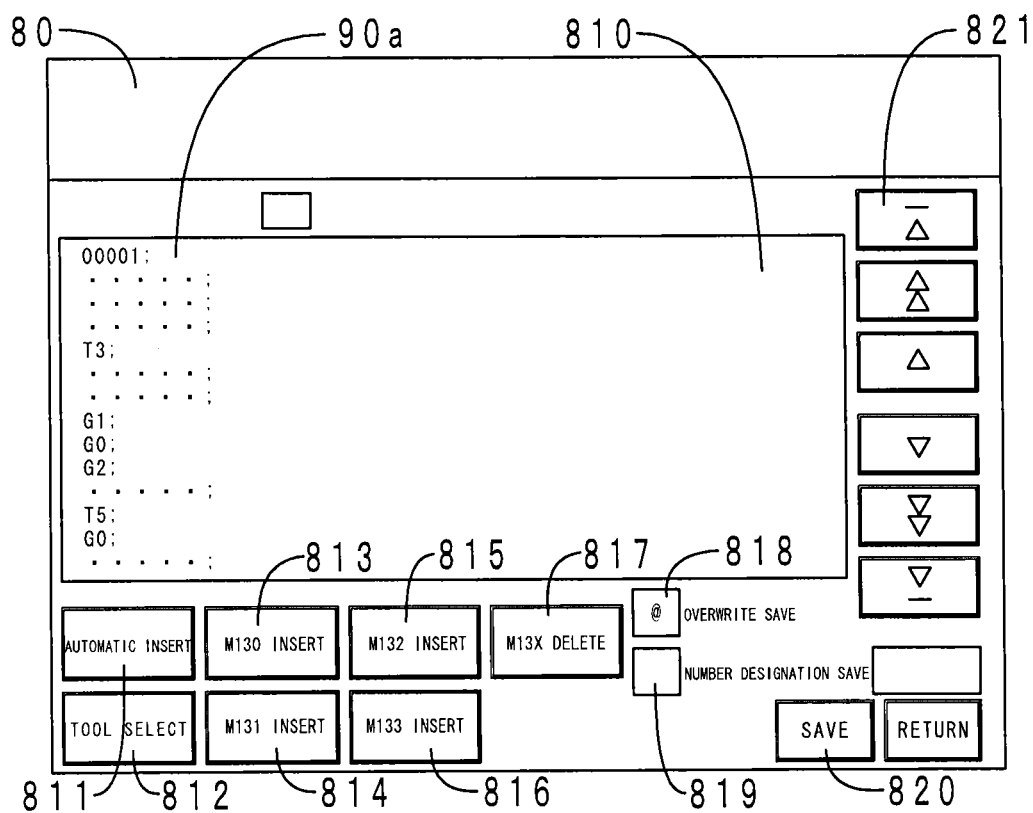
FIG. 6 is a schematic view of a screen in a previous stage of a tool selecting step in the automatic monitoring interval-setting method.
Figure 7:
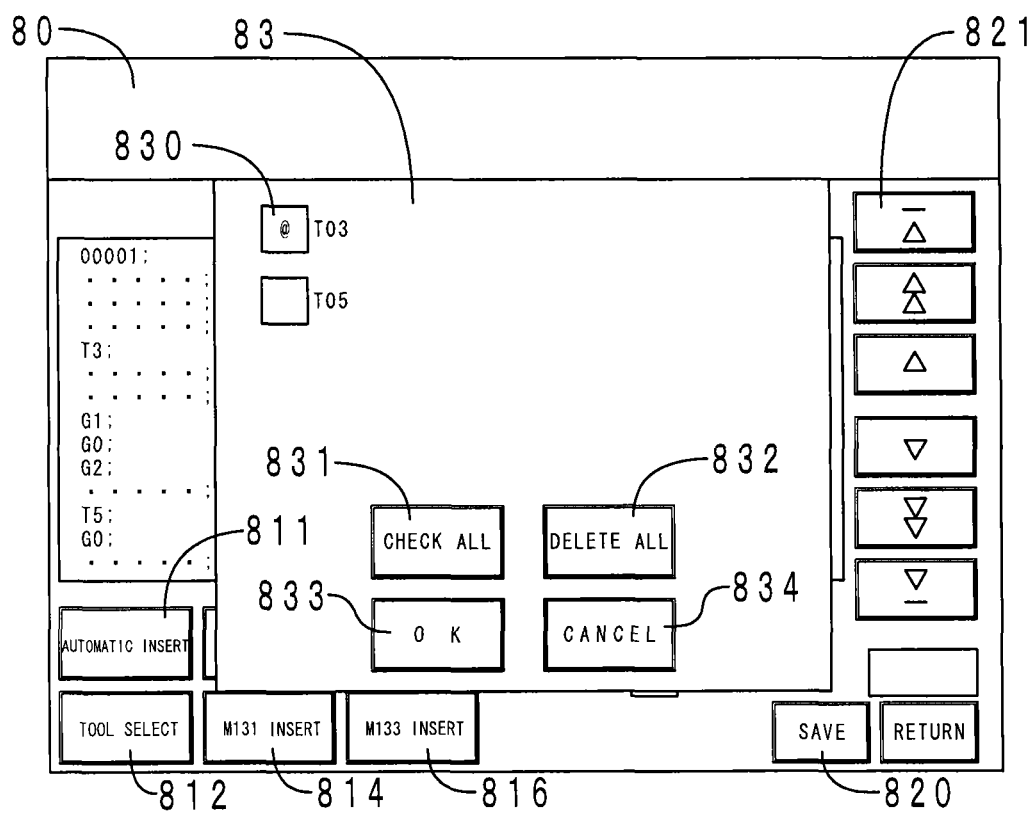
FIG. 7 is a schematic view of a screen in a subsequent stage of the tool selecting step.

(Tool Selecting Step) In FIG. 6, a schematic view of a screen in a previous stage of the tool selecting step in the automatic monitoring interval-setting method of this embodiment is illustrated. In FIG. 7, a schematic view of a screen in a subsequent stage of the tool selecting step is illustrated. When the operator touches the OK button 802b illustrated in FIG. 5, as illustrated in FIG. 6, the screen 80 is switched. In this step, the operator selects the tool T3 to which the monitoring interval is planned to be automatically set from a plurality of tools T3 and T5 (refer to FIG. 3) used in the program 90a.

As illustrated in FIG. 6, on the screen 80, a program display section 810, an automatic insert button 811, a tool select button 812, an M130 insert button 813, an M131 insert button 814, an M132 insert button 815, an M133 insert button 816, an M code delete button 817, an overwrite save check box 818, a number designation save check box 819, a save button 820, and six cursor movement buttons 821 are arranged. Furthermore, the program 90a displayed in the program display section 810 is a part of the program 90a on the left side of FIG. 3.

In this step, first, the operator touches the tool select button 812. The calculating section 21 illustrated in FIG. 2 retrieves a T code relevant to the tools T1 to T10 from the program 90a. Then, the calculating section 21, as illustrated in FIG. 7, displays a pop-up block 83 on the screen 80. In the pop-up block 83, two tool check boxes 830, a check all button 831, a delete all button 832, an OK button 833, and a CANCEL button 834 are arranged. The two tool check boxes 830 correspond to two types of tools T3 and T5 included in the program 90a.

Next, the operator suitably manipulates the check all button 831, the delete all button 832, the OK button 833, and the CANCEL button 834, and thus inputs a check mark "@" only in the tool check box 830 of the desired tool T3.

Specifically, when the operator touches the check all button 831, the calculating section 21 inputs the check mark "@" in all of the tool check boxes 830. When the operator touches the delete all button 832, the calculating section 21 deletes the check mark "@" from all of the tool check boxes 830. When the operator touches the cursor movement button 821, a cursor (not illustrated) is able to be moved to any one of the two tool check boxes 830. For example, when the operator touches the OK button 833 in a state where the cursor is moved to the tool check box 830 of the tool T3, the calculating section 21 inputs the check mark "@" in the tool check box 830 of the tool T3. For example, when the operator touches the CANCEL button 834 in a state where the cursor is moved to the tool check box 830 of the tool T5, the calculating section 21 deletes the check mark "@" from the tool check box 830 of the tool T5.

Thus, the operator selects the tool T3 to which the monitoring interval is set by suitably manipulating the check all button 831, the delete all button 832, the OK button 833, and the CANCEL button 834.

Figure 8:
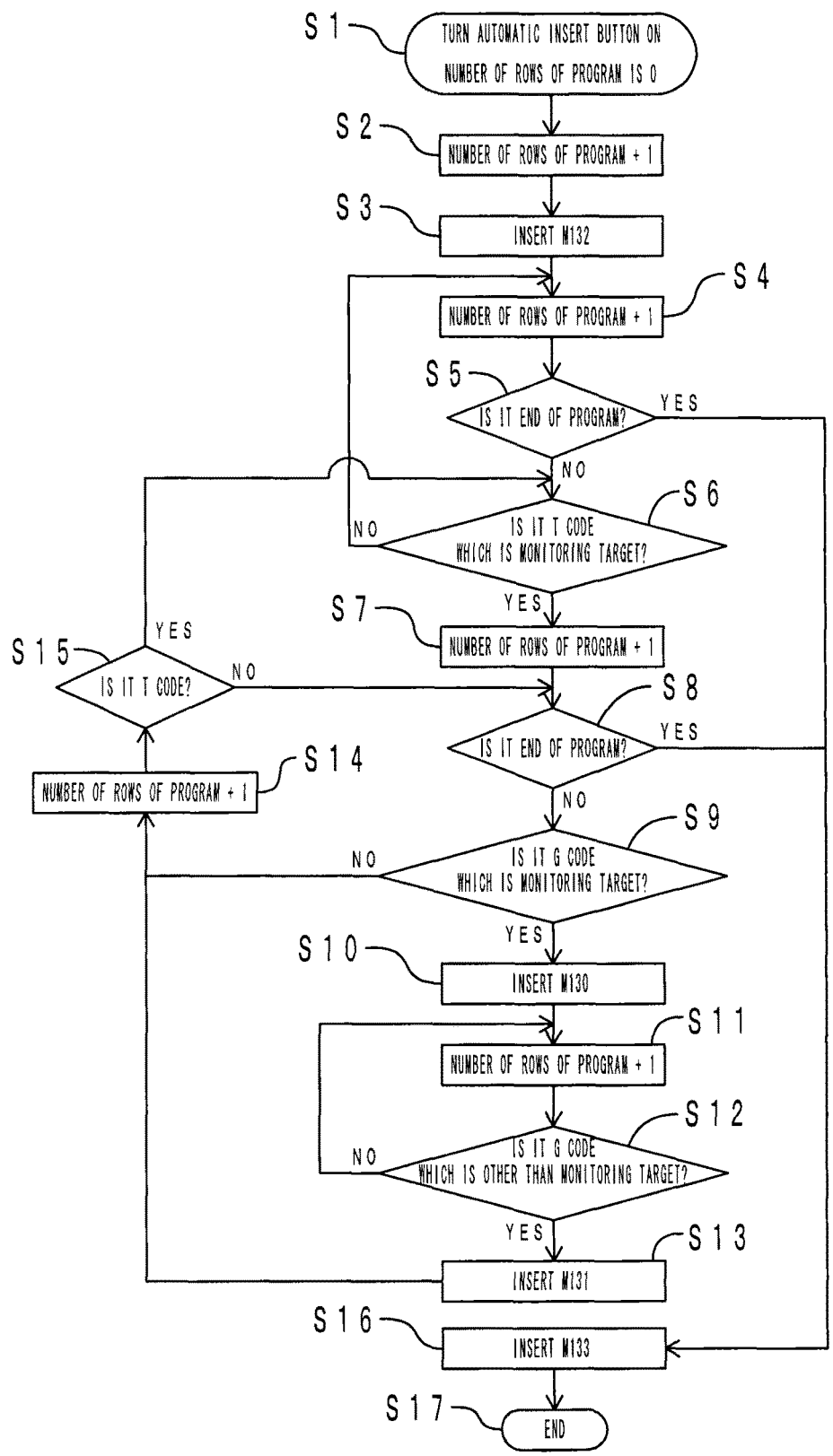
FIG. 8 is a flowchart of a monitoring interval setting step in the automatic monitoring interval-setting method.
Figure 9:
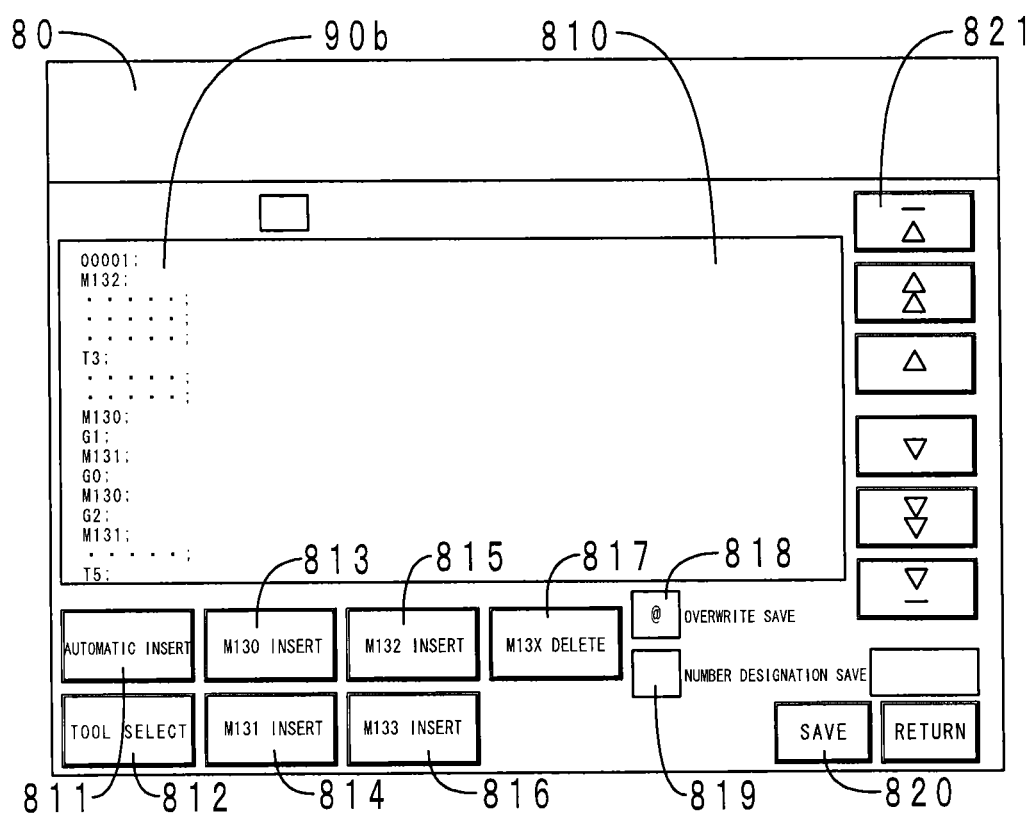
FIG. 9 is a schematic view of a screen after ending the monitoring interval setting step.

(Monitoring Interval Setting Step) In FIG. 8, a flowchart of the monitoring interval setting step in the automatic monitoring interval-setting method of this embodiment is illustrated. In FIG. 9, a schematic view of a screen after ending the monitoring interval setting step is illustrated. In this step, the calculating section 21 illustrated in FIG. 2 automatically sets the monitoring interval in the program 90a illustrated in FIG. 3. That is, the program 90b illustrated in FIG. 3 is automatically prepared.

When the operator touches the automatic insert button 811 illustrated in FIG. 7, the calculating section 21 starts this step (S1 of FIG. 8 (Step 1, the same applies to the following)). The calculating section 21 allows the program 90a illustrated in FIG. 3 to progress by one row, and inserts M132 (S2 and S3 of FIG. 8). The calculating section 21 allows the program 90a illustrated in FIG. 3 to progress by one row, and discriminates whether or not the program 90a is ended (S4 and S5 of FIG. 8). When the program 90a is ended, as illustrated in FIG. 3, M133 is inserted into a row which is one row prior to M30 indicating that the program is ended (S16 of FIG. 8) by one row. Then, the process is ended (S17 of FIG. 8).

When the program 90a is not ended, the calculating section 21 discriminates whether or not the T code (that is, T3) which is a monitoring target is included in a current row (S6 of FIG. 8). When T3 is not included in the current row, the process returns to S4.

In S6 of FIG. 8, when T3 is included in the current row, the program 90a illustrated in FIG. 3 progresses by one row, and it is discriminated whether or not the program 90a is ended (S7 and S8 of FIG. 8). When the program 90a is ended, the process proceeds to S16.

When the program 90a is not ended, the calculating section 21 discriminates whether or not the G code (that is, any one of G1 to G3) which is the monitoring target is included in the current row (S9 of FIG. 8). When G1 to G3 are not included in the current row, the calculating section 21 allows the program 90a illustrated in FIG. 3 to progress by one row, and discriminates whether or not the T code (that is, T3 and T5) is included in the row (S14 and S15 of FIG. 8). When the T code is included in the row, the process returns to S6. When the T code is not included in the row, the process returns to S8.

In S9 of FIG. 8, when any one of G1 to G3 is included in the current row, the calculating section 21 inserts M130 into a row which is one row prior to the current row (a row including any one of G1 to G3) (S10 of FIG. 8). Then, the program 90a illustrated in FIG. 3 progresses by one row, and discriminates whether or not a G code other than the monitoring target (that is, a G code other than G1 to G3, for example, G0) is included in the row (S11 and S12 of FIG. 8). When the G code other than G1 to G3 is not included in the row, the process returns to S11.

In S12 of FIG. 8, when the G code other than G1 to G3 is included in the row, the calculating section 21 inserts M131 into a row which is one row subsequent to the row including any one of G1 to G3 (S13 of FIG. 8). Then, the process proceeds to S14.

After that, when the T code is not included in the row, and when the program 90a is ended, M133 is inserted into a row which is one row prior to M30, and the process is ended (S15, S8, S16, and S17 of FIG. 8). In addition, when the T code is included in the row but is not T3 (that is, T5), and when the program 90a is ended, M133 is inserted into a row which is one row prior to M30, and the process is ended (S15, S6, S4, S5, S16, and S17 of FIG. 8).

Thus, in this step, the calculating section 21 automatically inserts the M code (M130 to M133) into the program 90a illustrated in FIG. 3. Then, the program 90b is prepared. As illustrated in FIG. 9, a part of the program 90b is displayed on the program display section 810 of the screen 80.

Figure 10:
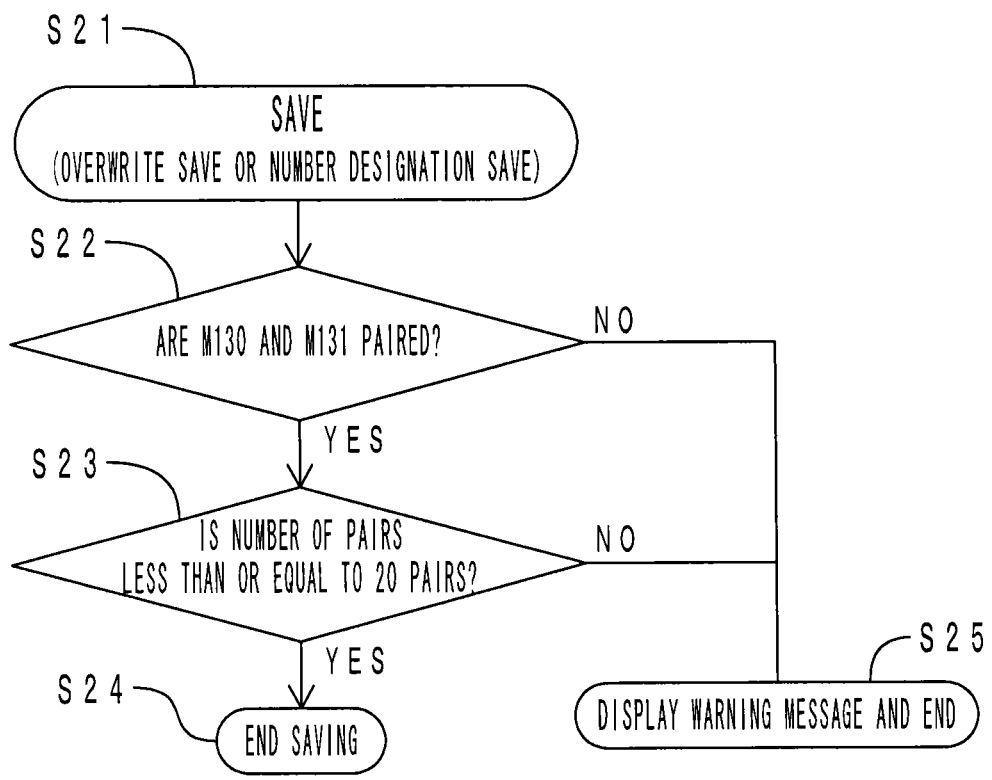
FIG. 10 is a flowchart of an inspecting-saving step in the automatic monitoring interval-setting method.
Figure 11:
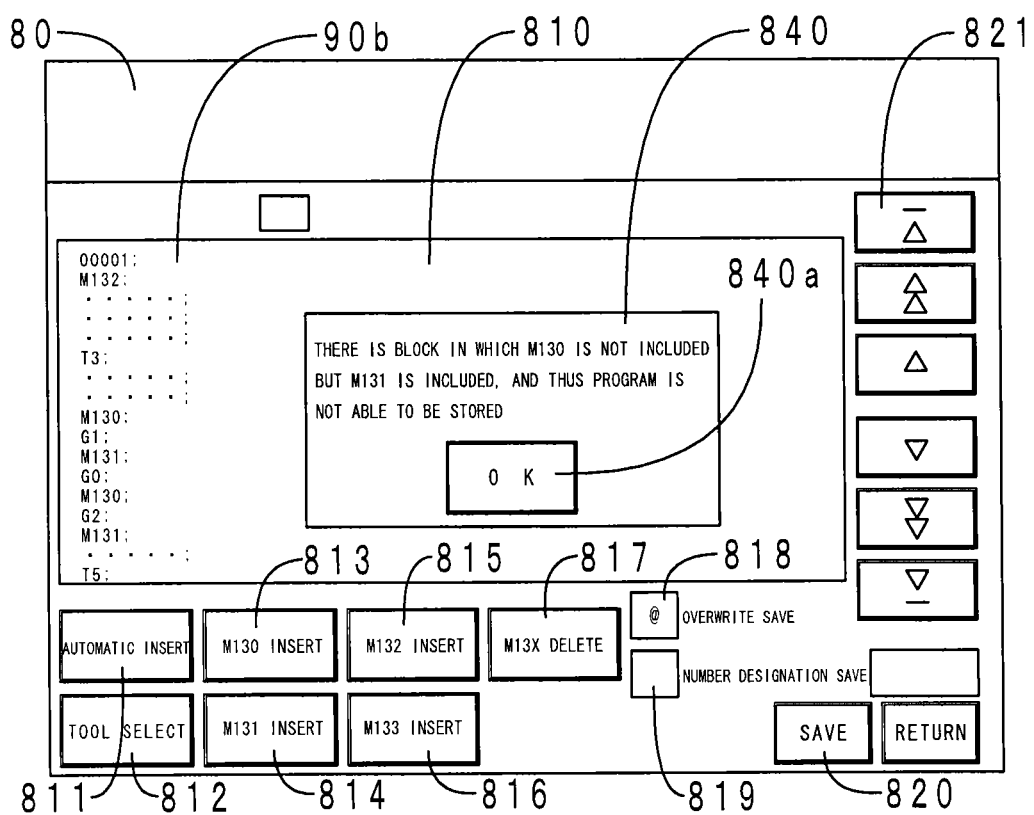
FIG. 11 is a schematic view of a screen after ending the inspecting-saving step.

(Inspecting-Saving Step) In FIG. 10, a flowchart of the inspecting-saving step in the automatic monitoring interval-setting method of this embodiment is illustrated. In FIG. 11, a schematic view of a screen after ending the inspecting-saving step is illustrated. In this step, the calculating section 21 illustrated in FIG. 2 inspects the program 90b illustrated in FIG. 3, and stores the program 90b in the memory section 20.

When the operator touches the cursor movement button 821, the cursor is able to be moved to the overwrite save check box 818 or the number designation save check box 819. The overwrite save check box 818 is used at the time of overwriting the program 90b on the program 90a of the memory section 20 illustrated in FIG. 2. The number designation save check box 819 is used at the time of allocating a new number other than "1" to the program 90b and of storing the new number in the memory section 20 illustrated in FIG. 2.

For example, when the operator touches the save button 820 in a state where the cursor is moved to the overwrite save check box 818, the calculating section 21 inputs the check mark "@" in the overwrite save check box 818. Then, before the program 90b is stored, the calculating section 21 executes the inspection (S21 of FIG. 10).

The calculating section discriminates whether or not a pair of M130 and M131 are formed in the program 90b illustrated in FIG. 3 (S22 of FIG. 10). When M131 is included, but M130 is not included prior to M131 by interposing any one of G1 to G3, or when M130 is included, but M131 is not included subsequent to M130 by interposing any one of G1 to G3, the calculating section 21 discriminates that the pair is not formed.

In this case, the calculating section 21 displays a warning message 840 on the screen 80 as illustrated in FIG. 11 (S25 of FIG. 10). The operator touches an OK button 840a, and visually confirms the program 90b of the program display section 810. As a result of the confirmation, a portion in which the pair is not formed is found in the program 90b, and the operator forms the pair by suitably manipulating a manual input button (the M130 insert button 813, the M131 insert button 814, the M132 insert button 815, the M133 insert button 816, and the M code delete button 817). That is, the operator manually rewrites the program 90b. Then, the operator touches the save button 820 again.

In contrast, when the pair is formed, the calculating section 21 inspects whether or not "total number of pairs≤20 pairs" is satisfied (S23 of FIG. 10). When the total number of pairs exceeds 20 pairs, the process proceeds to S25. When the total number of pairs is less than or equal to 20 pairs, the calculating section 21 stores the program 90b in the memory section 20 (S24 of FIG. 10). As illustrated in FIG. 11, the check mark "@" is input in the overwrite save check box 818. For this reason, the program 90a illustrated in FIG. 3 is updated to the program 90b.

Furthermore, the displayed contents of the warning message 840 illustrated in FIG. 11 are different according to the reason for failing the inspection. When M130 is included, but M131 is not included, "there is a block in which M130 is included but M131 is not included, and thus the program is not able to be stored" is displayed as the warning message 840. In addition, when the total number of pairs exceeds twenty pairs, "the total number of pairs exceeds an upper limit (20) of the number of M130/M131 pairs, and thus the program is not able to be stored" is displayed as the warning message 840.

[Change in Load Applied to Tool at the time of Processing Workpiece] Next, a change in a load applied to the tool T3 when the CNC turning machine 1 of this embodiment performs the processing with respect to the workpiece W will be described. Hereinafter, a change in a load of the program 90b illustrated in FIG. 3 and the tool T3 in a successive zone "M130-G1-M131" will be described.

Figure 12:
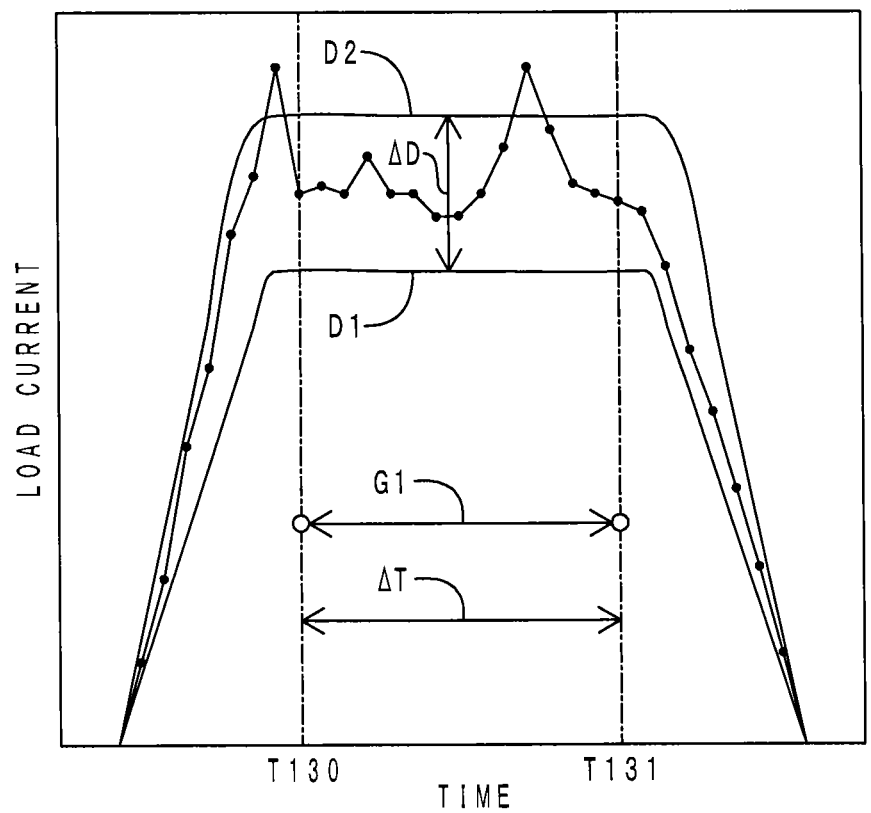
FIG. 12 is a graph illustrating a time change in a load current of a main axis motor.

In FIG. 12, a graph of a time change in a load current of the main axis motor is illustrated. The load current of a main axis motor 63C is relevant to the torque of the main axis motor 63C and the load applied to the tool T3. The load applied to the tool T3 increases as the load current becomes larger. In addition, the load applied to the tool T3 decreases as the load current becomes smaller. In addition, a time in a horizontal axis corresponds to a processing point (a position) of the workpiece W.

As illustrated in FIG. 12, a time T130 is a time at which a monitoring starting command (M130) is output in the program 90b. A time T131 is a time at which a monitoring ending command (M131) is output in the program 90b. That is, a time period between the time T130 and the time T131 corresponds to a monitoring interval ΔT. G1 is included in the monitoring interval ΔT.

Furthermore, even though it is not illustrated in FIG. 12, the calculating section 21 illustrated in FIG. 2 starts drawing the graph illustrated in FIG. 12 on the screen 80 at the time when a display starting command (M132) of FIG. 3 is output. In addition, the calculating section 21 illustrated in FIG. 2 ends the drawing of the graph illustrated in FIG. 12 at the time when a display ending command (M133) of FIG. 3 is output.

A lower limit threshold value D1 and an upper limit threshold value D2 of a monitoring region ΔD in the load current are set in advance to be changed according to the change in the load current. Here, even when the load current exceeds the monitoring region ΔD, the calculating section 21 illustrated in FIG. 2 neglects the change in the load current when an exceeding time exceeds the monitoring interval ΔT. That is, in a zone other than the monitoring interval ΔT, the torque of the main axis motor 63C is easily considerably changed. For this reason, the load current easily exceeds the monitoring region ΔD. Therefore, in order to avoid erroneous discrimination, the calculating section 21 neglects the change in the load current.

In contrast, when the exceeding time of the load current is within the monitoring interval ΔT, the calculating section 21 illustrated in FIG. 2 executes predetermined processing (for example, stopping the CNC turning machine 1). That is, in the monitoring interval ΔT, when the load current exceeds the monitoring region ΔD, the blade of the tool T3 is more likely to be chipped. Therefore, the calculating section 21 executes predetermined processing on the assumption of the chipping.

[Action Effect] Next, an action effect of the CNC turning machine 1 of this embodiment will be described. Hereinafter, the CNC turning machine 1, the automatic monitoring interval-setting device 3, and the automatic monitoring interval-setting method are collectively referred to as the "CNC turning machine 1 or the like".

According to the CNC turning machine 1 or the like of this embodiment, as illustrated in FIG. 3, it is possible to automatically insert M130 into the front of each of G1 and G2 of the program 90a. In addition, it is possible to automatically insert M131 into the rear of each of G1 and G2 of the program 90a. That is, it is possible to automatically set the monitoring interval (a zone from M130 to M131) in the program 90a such that each of G1 and G2 is interposed from front and rear directions. For this reason, as illustrated in FIG. 12, it is possible to monitor the load current of the main axis motor 63C, that is, the load applied to the tool T3 at the time of processing the workpiece W. Therefore, for example, it is possible to detect damage in the tool T3 on the basis of the load.

In addition, according to the CNC turning machine 1 or the like of this embodiment, a human mistake such as overlapping of the monitoring interval or setting of an incomplete monitoring interval rarely occurs compared to a case where the monitoring interval is manually set. Therefore, even when the number of settings of the monitoring interval increases, it is possible to accurately set the monitoring interval.

In addition, according to the CNC turning machine 1 or the like of this embodiment, as illustrated in FIG. 3, the calculating section 21 respectively inserts M132 starting the display of the load on the display device 8 (refer to FIG. 12) and M133 ending the display of the load such that M130 and M131 are inserted between M132 and M133 with respect to the program 90a, in the monitoring interval setting step. For this reason, the operator is able to confirm the load through the screen 80. In addition, the load applied to the tool T3 (the load current of the main axis motor 63C) is displayed as a graph on the screen 80. For this reason, the operator easily grasps the change in the load.

In addition, according to the CNC turning machine 1 or the like of this embodiment, as illustrated in FIG. 5, the calculating section 21 executes the program selecting step of selecting the program 90*a* which inserts M130 and M131 from a plurality of programs 90*a* before the monitoring interval setting step. For this reason, it is possible to set the monitoring interval with respect to a desired program 90*a* among the plurality of programs 90*a*. That is, it is possible to perform the monitoring of the load with respect to the desired program 90*a* (a desired workpiece W).

In addition, according to the CNC turning machine 1 or the like of this embodiment, as illustrated in FIG. 7, the calculating section 21 executes the tool selecting step of selecting the tool T3 into which M130 and M131 are inserted from the plurality of tools T3 and T5 in the desired program 90*a* between the program selecting step and the monitoring interval setting step. For this reason, it is possible to set the monitoring interval with respect to a desired tool T3 among the plurality of tools T3 and T5. That is, it is possible to perform the monitoring of the load with respect to the desired tool T3.

In addition, according to the CNC turning machine 1 or the like of this embodiment, as illustrated in FIG. 9, the calculating section 21 executes the inspecting-saving step of inspecting M130 and M131 which are inserted into the program 90*b* and of storing the program 90*b* after the monitoring interval setting step. For this reason, it is possible to detect a setting mistake of the monitoring interval which is set by the monitoring interval setting step. In addition, it is possible to store the program 90*b* after being inspected in the memory section 20 illustrated in FIG. 2.

In addition, according to the CNC turning machine 1 or the like of this embodiment, as illustrated in FIG. 10, the program 90*b* is prepared such that the number of M130/M131 pairs is less than or equal to 20 pairs. For this reason, it is possible to save the capacity of the memory section 20 illustrated in FIG. 2.

In addition, according to the CNC turning machine 1 or the like of this embodiment, as illustrated in FIGS. 3, M130 and M131 are inserted into both front and rear sides of G1 and G2, and thus it is possible to simply set the monitoring interval.

Second Embodiment

A difference between a CNC turning machine or the like of this embodiment and the CNC turning machine or the like of the first embodiment is that a pair of M codes are set with respect to a plurality of successive G codes in a program. Here, only the difference will be described.

Figure 13:
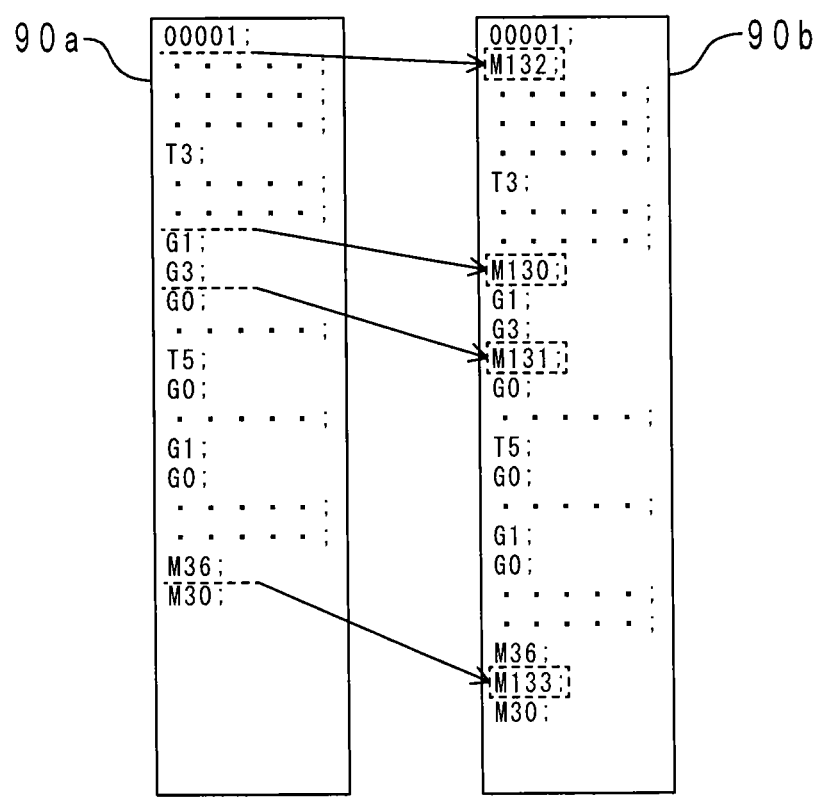
FIG. 13 is a schematic view of a program before and after automatically setting a monitoring interval in an automatic monitoring interval-setting method of a second embodiment.

In FIG. 13, a schematic view of a program before and after automatically setting a monitoring interval in an automatic monitoring interval-setting method of this embodiment is illustrated. Furthermore, the same reference numerals are applied to portions corresponding to that of FIG. 3. As illustrated on a left side of FIG. 13, in the program 90*a* before automatically setting the monitoring interval, G1, G3, and G0 are successively arranged. In this case, a calculating section of the automatic monitoring interval-setting device inserts M130 into a row which is one row prior to G1 as illustrated in S9 and S10 of attached FIG. 8. In addition, the calculating section inserts M131 into a row which is one row subsequent to G3 on the basis of G0 as illustrated in S12 and S13 of FIG. 8.

The CNC turning machine or the like of this embodiment and the CNC turning machine or the like of the first embodiment have the same action effect with respect to the portions having the common configuration. In addition, according to the CNC turning machine or the like of this embodiment, as illustrated in FIG. 13, it is possible to comprehensively set the monitoring interval with respect to G1 and G3. For this reason, a setting operation of the monitoring interval becomes simple compared to a case where the monitoring interval is individually set with respect to G1 and G3. In addition, it is possible to reduce the number of insertions of M130 and M131 with respect to the program 90*a*. Therefore, it is possible to prevent the program 90*b* from being redundant.

<Others> As described above, the embodiments of the automatic monitoring interval-setting device and the machine tool of the present disclosure are described. However, the embodiment is not particularly limited to the aspects described above. A person skilled in the art is also able to perform various modifications and improvements.

In the embodiment described above, as illustrated in FIG. 8, when the G code which is a code other than the monitoring target (that is, G0) is in an arbitrary row of the program 90*a* illustrated in FIG. 3, the calculating section 21 illustrated in FIG. 2 inserts M131 after the G code which is the monitoring target (that is, any one of G1 to G3). However, according to the program 90*a*, G0 may not be subsequent to G1 to G3. In this case, the calculating section 21 may respectively insert M130 before the row and M131 after the row, on the basis of the fact that the G code which is the monitoring target (that is, any one of G1 to G3) is in an arbitrary row. That is, the calculating section 21 may not discriminate whether or not M131 is inserted on the basis of the presence or absence of the G code which is a code other that the monitoring target (that is, G0).

In the embodiment described above, as illustrated in FIG. 3 and FIG. 13, M133 is inserted into a row which is one row prior to M30 indicating that the program is ended. However, M133 may be inserted into a row which is one row prior to M02 and M99. Similar to M30, M02 and M99 are also the M code indicating that the program is ended.

In the embodiment described above, as illustrated in FIG. 10, the inspecting step and the saving step of the present disclosure are executed as the inspecting-saving step. However, first, the inspecting step may be executed, and then the saving step may be executed. In this case, the operator touches an inspection execute button (not illustrated) displayed on the screen 80 illustrated in FIG. 9. The calculating section 21 executes S22 and S23 illustrated in FIG. 10. When the inspection is failed, the process proceeds to S25. When the inspection is successful, the save button 820 on the screen 80 illustrated in FIG. 9 is in an active state (in which input is enabled). When the operator touches the save button 820, the calculating section 21 stores the program 90*b* in the memory section 20. Thus, the inspecting step and the saving step may be separately executed.

As illustrated in FIG. 1 and FIG. 2, the load applied to the tool T3 may be detected from a load current, a load voltage, a torque, and the like of at least one of the main axis motor 63C, the X-axis motor 45X, and the Z-axis motor 45Z.

The main axis direction of the CNC turning machine 1 is not particularly limited. That is, the machine tool of the present disclosure may be embodied as a horizontal turning machine, a frontal turning machine, and a vertical turning machine. In addition, the machine tool of the present disclosure may be embodied as a milling machine, a drilling machine, and a milling cell.

The invention claimed is:

1. An automatic monitoring interval-setting device, comprising:
   a control device including a memory section which stores a program including a processing command processing a workpiece by using a tool to be monitored, and a calculating section which is able to automatically edit the program to execute a monitoring interval setting step, the monitoring interval setting step including determining whether the processing command of the tool to be monitored is included in a current row of the program, inserting a monitoring starting command starting monitoring of a load applied to the tool into a row of the program prior to the current row of the program including the processing command of the tool to be monitored, when the calculating section determines that the processing command of the tool to be monitored in included in the current row of the program, and inserting a monitoring ending command ending the monitoring of the load into a row of the program subsequent to the row of the program including the processing command, wherein control device is configured to change the load applied to the tool when the monitored load applied to the tool during the monitoring interval is greater than a predetermined value, wherein when the program includes a plurality of successive processing commands, the calculating section respectively inserts the monitoring starting command into a row of the program prior to a row of the program including the first processing command and the monitoring ending command into a row of the program subsequent to a row of the program including the last processing command with respect to the program, in the monitoring interval setting step, wherein the automatic monitoring interval-setting device further comprises a display device which is able to display data relevant to the program, and wherein the calculating section respectively inserts a display starting command starting display of the load on the display device and a display ending command ending the display of the load such that the monitoring starting command and the monitoring ending command are inserted between the display starting command and the display ending command with respect to the program, in the monitoring interval setting step.

2. The automatic monitoring interval-setting device according to claim 1, wherein the calculating section executes a program selecting step of selecting the program which inserts the monitoring starting command and the monitoring ending command from a plurality of programs, before the monitoring interval setting step.

3. The automatic monitoring interval-setting device according to claim 1, wherein the calculating section executes a tool selecting step of selecting the tool which inserts the monitoring starting command and the monitoring ending command from a plurality of tools, before the monitoring interval setting step.

4. The automatic monitoring interval-setting device according to claim 1, wherein the calculating section executes an inspecting step of inspecting the monitoring starting command and the monitoring ending command which are inserted into the program, after the monitoring interval setting step.

5. The automatic monitoring interval-setting device according to claim 1, wherein the calculating section executes a saving step of storing the program into which the monitoring starting command and the monitoring ending command are inserted in the memory section, after the monitoring interval setting step.

6. The automatic monitoring interval-setting device according to claim 1, wherein the processing command is a G code, and wherein the monitoring starting command and the monitoring ending command are M codes which are different from each other.

7. A machine tool comprising the automatic monitoring interval-setting device according to claim 1.

8. An automatic monitoring interval-setting method, comprising:

providing a program including a processing command processing a workpiece by using a tool to be monitored;

automatically editing the program to execute a monitoring interval setting step, the monitoring interval setting step including determining whether the processing command of the tool to be monitored is included in a current row of the program, inserting a monitoring starting command starting monitoring of a load applied to a tool into a row of the program prior to the current row of the program including the processing command of the tool to be monitored, when the calculating section determines that the processing command of the tool to be monitored in included in the current row of the program, and inserting a monitoring ending command ending the monitoring of the load into a row of the program subsequent to the row of the program including the processing command; and changing the load applied to the tool when the monitored load applied to the tool during the monitoring interval is greater than a predetermined value, wherein when the program includes a plurality of successive processing commands, the monitoring starting command is inserted into a row of the program prior to a row of the program including the first processing command and the monitoring ending command is inserted into a row of the program subsequent to a row of the program including the last processing command, respectively, with respect to the program, in the monitoring interval setting step, and wherein a display starting command starting display of the load on a display device which is able to display data relevant to the program and a display ending command ending the display of the load are respectively inserted such that the monitoring starting command and the monitoring ending command are inserted between the display starting command and the display ending command with respect to the program, in the monitoring interval setting step.

9. The automatic monitoring interval-setting method according to claim 8, further comprising:

a program selecting step of selecting the program which inserts the monitoring starting command and the monitoring ending command from a plurality of programs, before the monitoring interval setting step.

10. The automatic monitoring interval-setting method according to claim 8, further comprising:

a tool selecting step of selecting the tool which inserts the monitoring starting command and the monitoring ending command from a plurality of tools, before the monitoring interval setting step.

11. The automatic monitoring interval-setting method according to claim 8, further comprising:

an inspecting step of inspecting the monitoring starting command and the monitoring ending command which are inserted into the program, after the monitoring interval setting step.

12. The automatic monitoring interval-setting method according to claim 8, further comprising:
a saving step of storing the program into which the monitoring starting command and the monitoring ending command are inserted, after the monitoring interval setting step.

13. The automatic monitoring interval-setting method according to claim 8, wherein the processing command is a G code, and
wherein the monitoring starting command and the monitoring ending command are M codes which are different from each other.

* * * * *